United States Patent
Tondwalkar et al.

(10) Patent No.: US 12,476,883 B2
(45) Date of Patent: Nov. 18, 2025

(54) METHOD, APPARATUS AND COMPUTER PROGRAM FOR DETERMINING QUALITY OF EXPERIENCE OF AN APPLICATION SESSION CLASS

(71) Applicant: Nokia Technologies Oy, Espoo (FI)

(72) Inventors: Ankita Tondwalkar, Rochester, NY (US); Devaki Chandramouli, Dallas, TX (US); Rainer Liebhart, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/538,087

(22) Filed: Dec. 13, 2023

(65) Prior Publication Data

US 2024/0205109 A1 Jun. 20, 2024

(30) Foreign Application Priority Data

Dec. 14, 2022 (GB) .................................... 2218798

(51) Int. Cl.
*G06F 11/16* (2006.01)
*H04L 41/0816* (2022.01)
*H04L 41/5025* (2022.01)

(52) U.S. Cl.
CPC ...... *H04L 41/5025* (2013.01); *H04L 41/0816* (2013.01)

(58) Field of Classification Search
CPC ............. H04L 41/5025; H04L 41/0816; H04L 41/5067; H04L 43/08; H04L 41/5009; H04W 28/24; H04W 24/02
See application file for complete search history.

(56) References Cited

U.S. PATENT DOCUMENTS

| | | |
|---|---|---|
| 2011/0149775 A1 | 6/2011 | Lee et al. |
| 2015/0304737 A1 | 10/2015 | Franklin et al. |
| 2017/0149535 A1* | 5/2017 | Panattu .................. H04L 1/189 |
| 2020/0322654 A1 | 10/2020 | Lundberg et al. |
| 2020/0328947 A1 | 10/2020 | Iwai et al. |
| 2022/0124141 A1 | 4/2022 | Ramanujam et al. |
| 2022/0191597 A1 | 6/2022 | Nadeau |
| 2022/0385716 A9 | 12/2022 | Dunne et al. |
| 2024/0089183 A1* | 3/2024 | Vangala .............. H04L 41/5067 |

FOREIGN PATENT DOCUMENTS

WO 2015/057212 A1 4/2015

OTHER PUBLICATIONS

"Further discussion on RAN visible QoE", 3GPP TSG-RAN3 Meeting #114-bis-e, R3-220923, Agenda: 15.3, Samsung, Jan. 17-26, 2022, 6 pages.
Search Report received for corresponding United Kingdom Patent Application No. 2218798.3, dated Jun. 13, 2023, 4 pages.

* cited by examiner

*Primary Examiner* — Padma Mundur
(74) *Attorney, Agent, or Firm* — Nokia Technologies Oy (57) ABSTRACT

There is provided an apparatus comprising means for determining a quality of experience value associated with a user equipment's application session, the quality of experience value being based on one or more values associated with a respective one or more quality of service metrics for the user equipment's session. The apparatus also comprising means for adjusting one or more network parameters based on the determined quality of experience value.

23 Claims, 5 Drawing Sheets

METHOD, APPARATUS AND COMPUTER PROGRAM FOR DETERMINING QUALITY OF EXPERIENCE OF AN APPLICATION SESSION CLASS

FIELD

The present application relates to a method, apparatus and computer program and in particular but not exclusively to a system for wireless communications.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for:
a. determining a quality of experience value associated with a user equipment's application session, the quality of experience value being based on one or more values associated with a respective one or more quality of service metrics for the user equipment's session; and
b. adjusting one or more network parameters based on the determined quality of experience value.

In an example, the quality of experience value is determined based on an aggregate score comprising the sum of the one or more values associated with the respective one or more quality of service metrics for the user and the application.

In an example, the one or more quality of service metrics have respective weighting values, and wherein the sum is a weighted sum based on the weighting values.

In an example, the quality of experience value is one of: the aggregate score; or determined based on applying a mapping function to the aggregate score.

In an example, the apparatus is comprising means for: determining one or more actual metric values for the respective one or more quality of service metrics; and determining a value of the one or more values based on the actual metric value for the quality of service metric and a plurality of absolute category score ratings for the quality of service metric, wherein each of the plurality of absolute category rating scores are associated with a range of values for the quality of service metric.

In an example, the value of the one or more values corresponds to the absolute category score rating associated with the range of values that comprises the actual metric value.

In an example, the apparatus is comprising means for: comparing the determined quality of experience value to a threshold value, wherein the adjusting is performed based on the comparing.

In an example, the apparatus is comprising means for: receiving, from the user equipment, at least one of: the aggregate score; at least one value of the one or more values associated with the respective one or more quality of service metrics; a quality of experience value determined by the user equipment.

In an example, the apparatus is comprising means for receiving, from a network function entity or a device, at least one value of the one or more values associated with the respective one or more quality of service metrics.

In an example, the adjusting comprises: comparing the determined quality of experience value to a threshold value; and adjusting the one or more network quality of service parameters based on the comparison.

In an example, the adjusting comprises: sending, to the application, a request to adapt one or more quality of service parameters associated with the user equipment's session.

In an example, the adjusting comprises: sending, to an application function providing the user equipment's application session, at least one of: information identifying the user equipment, the determined quality of experience value, the quality of service metrics, and other related data.

In an example, one of: the apparatus is comprised within a network function, the apparatus is for the network function, and the apparatus is the network function.

According to an aspect, there is provided an apparatus comprising means for:
a. determining one or more values associated with a respective one or more quality of service metrics for a user equipment's application session; and
b. sending, to a network, information based on the determined one or more values.

In an example, the information based on the determined one or more values comprises at least one of: the determined one or more values; and a quality of experience value determined based on the determined one or more values, wherein the apparatus comprises means for determining the quality of experience value.

In an example, the quality of experience value is determined based on an aggregate score comprising the sum of the one or more values associated with the respective one or more quality of service metrics for the user and the application.

In an example, the one or more quality of service metrics have respective weighting values, and wherein the sum is a weighted sum based on the weighting values.

In an example, the quality of experience value is one of: the aggregate score; or determined based on applying a mapping function to the aggregate score.

In an example, the apparatus is comprising means for: determining an actual metric value for the respective one or more quality of service metrics; and determining a value of the one or more values based on the actual metric value for the quality of service metric and a plurality of absolute category score ratings, wherein each of the plurality of absolute category rating scores are associated with a range of values for a quality of service metric.

In an example, the value of the one or more values corresponds to the absolute category score rating associated with the range of values that comprises the actual metric value.

In an example, one of: the apparatus is comprised within the user equipment, the apparatus is for the user equipment, and the apparatus is the user equipment.

According to an aspect, there is provided an apparatus may comprise at least one processor, and at least one memory storing instructions that, when executed by the one or more processors, cause the apparatus to perform:
 a. determining a quality of experience value associated with a user equipment's application session, the quality of experience value being based on one or more values associated with a respective one or more quality of service metrics for the user equipment's session; and
 b. adjusting one or more network parameters based on the determined quality of experience value.

In an example, the quality of experience value is determined based on an aggregate score comprising the sum of the one or more values associated with the respective one or more quality of service metrics for the user and the application.

In an example, the one or more quality of service metrics have respective weighting values, and wherein the sum is a weighted sum based on the weighting values.

In an example, the quality of experience value is one of: the aggregate score; or determined based on applying a mapping function to the aggregate score.

In an example, the apparatus is caused to perform: determining one or more actual metric values for the respective one or more quality of service metrics; and determining a value of the one or more values based on the actual metric value for the quality of service metric and a plurality of absolute category score ratings for the quality of service metric, wherein each of the plurality of absolute category rating scores are associated with a range of values for the quality of service metric.

In an example, the value of the one or more values corresponds to the absolute category score rating associated with the range of values that comprises the actual metric value.

In an example, the apparatus is caused to perform: comparing the determined quality of experience value to a threshold value, wherein the adjusting is performed based on the comparing.

In an example, the apparatus is caused to perform: receiving, from the user equipment, at least one of: the aggregate score; at least one value of the one or more values associated with the respective one or more quality of service metrics; a quality of experience value determined by the user equipment.

In an example, the apparatus is caused to perform: receiving, from a network function entity or a device, at least one value of the one or more values associated with the respective one or more quality of service metrics.

In an example, the adjusting comprises: comparing the determined quality of experience value to a threshold value; and adjusting the one or more network quality of service parameters based on the comparison.

In an example, the adjusting comprises: sending, to the application, a request to adapt one or more quality of service parameters associated with the user equipment's session.

In an example, the adjusting comprises: sending, to an application function providing the user equipment's application session, at least one of: information identifying the user equipment, the determined quality of experience value, the quality of service metrics, and other related data.

In an example, one of: the apparatus is comprised within a network function, the apparatus is for the network function, and the apparatus is the network function.

According to an aspect, there is provided an apparatus may comprise at least one processor, and at least one memory storing instructions that, when executed by the one or more processors, cause the apparatus to perform:
 a. determining one or more values associated with a respective one or more quality of service metrics for a user equipment's application session; and
 b. sending, to a network, information based on the determined one or more values.

In an example, the information based on the determined one or more values comprises at least one of: the determined one or more values; and a quality of experience value determined based on the determined one or more values, wherein the apparatus comprises means for determining the quality of experience value.

In an example, the quality of experience value is determined based on an aggregate score comprising the sum of the one or more values associated with the respective one or more quality of service metrics for the user and the application.

In an example, the one or more quality of service metrics have respective weighting values, and wherein the sum is a weighted sum based on the weighting values.

In an example, the quality of experience value is one of: the aggregate score; or determined based on applying a mapping function to the aggregate score.

In an example, the apparatus is caused to perform: determining an actual metric value for the respective one or more quality of service metrics; and determining a value of the one or more values based on the actual metric value for the quality of service metric and a plurality of absolute category score ratings, wherein each of the plurality of absolute category rating scores are associated with a range of values for a quality of service metric.

In an example, the value of the one or more values corresponds to the absolute category score rating associated with the range of values that comprises the actual metric value.

In an example, one of: the apparatus is comprised within the user equipment, the apparatus is for the user equipment, and the apparatus is the user equipment.

According to an aspect, there is provided a method comprising:
a. determining a quality of experience value associated with a user equipment's application session, the quality of experience value being based on one or more values associated with a respective one or more quality of service metrics for the user equipment's session; and
b. adjusting one or more network parameters based on the determined quality of experience value.

In an example, the quality of experience value is determined based on an aggregate score comprising the sum of the one or more values associated with the respective one or more quality of service metrics for the user and the application.

In an example, the one or more quality of service metrics have respective weighting values, and wherein the sum is a weighted sum based on the weighting values.

In an example, the quality of experience value is one of: the aggregate score; or determined based on applying a mapping function to the aggregate score.

In an example, the method comprises: determining one or more actual metric values for the respective one or more quality of service metrics; and determining a value of the one or more values based on the actual metric value for the quality of service metric and a plurality of absolute category score ratings for the quality of service metric, wherein each of the plurality of absolute category rating scores are associated with a range of values for the quality of service metric.

In an example, the value of the one or more values corresponds to the absolute category score rating associated with the range of values that comprises the actual metric value.

In an example, the method comprises: comparing the determined quality of experience value to a threshold value, wherein the adjusting is performed based on the comparing.

In an example, the method comprises: receiving, from the user equipment, at least one of: the aggregate score; at least one value of the one or more values associated with the respective one or more quality of service metrics; a quality of experience value determined by the user equipment.

In an example, the method comprises: receiving, from a network function entity or a device, at least one value of the one or more values associated with the respective one or more quality of service metrics.

In an example, the adjusting comprises: comparing the determined quality of experience value to a threshold value; and adjusting the one or more network quality of service parameters based on the comparison.

In an example, the adjusting comprises: sending, to the application, a request to adapt one or more quality of service parameters associated with the user equipment's session.

In an example, the adjusting comprises: sending, to an application function providing the user equipment's application session, at least one of: information identifying the user equipment, the determined quality of experience value, the quality of service metrics, and other related data.

In an example, the method is performed by a network function.

According to an aspect, there is provided a method comprising:
a. determining one or more values associated with a respective one or more quality of service metrics for a user equipment's application session; and
b. sending, to a network, information based on the determined one or more values.

In an example, the information based on the determined one or more values comprises at least one of: the determined one or more values; and a quality of experience value determined based on the determined one or more values, wherein the apparatus comprises means for determining the quality of experience value.

In an example, the quality of experience value is determined based on an aggregate score comprising the sum of the one or more values associated with the respective one or more quality of service metrics for the user and the application.

In an example, the one or more quality of service metrics have respective weighting values, and wherein the sum is a weighted sum based on the weighting values.

In an example, the quality of experience value is one of: the aggregate score; or determined based on applying a mapping function to the aggregate score.

In an example, the method comprises: determining an actual metric value for the respective one or more quality of service metrics; and determining a value of the one or more values based on the actual metric value for the quality of service metric and a plurality of absolute category score ratings, wherein each of the plurality of absolute category rating scores are associated with a range of values for a quality of service metric.

In an example, the value of the one or more values corresponds to the absolute category score rating associated with the range of values that comprises the actual metric value.

In an example, the method is performed by the user equipment.

According to an aspect, there is provided a computer program comprising instructions, which when executed by an apparatus, cause the apparatus to perform at least the following:
a. determining a quality of experience value associated with a user equipment's application session, the quality of experience value being based on one or more values associated with a respective one or more quality of service metrics for the user equipment's session; and
b. adjusting one or more network parameters based on the determined quality of experience value.

According to an aspect, there is provided a computer program comprising instructions, which when executed by an apparatus, cause the apparatus to perform at least the following:
a. determining one or more values associated with a respective one or more quality of service metrics for a user equipment's application session; and
b. sending, to a network, information based on the determined one or more values.

According to an aspect, there is provided a computer program comprising instructions stored thereon for performing at least the following:
a. determining a quality of experience value associated with a user equipment's application session, the quality of experience value being based on one or more values associated with a respective one or more quality of service metrics for the user equipment's session; and
b. adjusting one or more network parameters based on the determined quality of experience value.

According to an aspect, there is provided a computer program comprising instructions stored thereon for performing at least the following:

a. determining one or more values associated with a respective one or more quality of service metrics for a user equipment's application session; and b. sending, to a network, information based on the determined one or more values.

An electronic device may comprise apparatus as described herein.

According to an aspect, there is provided a non-transitory computer readable medium comprising program instructions that, when executed by an apparatus, cause the apparatus to perform at least the method according to any of the preceding aspects.

In the above, many different embodiments have been described. It should be appreciated that further embodiments may be provided by the combination of any two or more of the embodiments described above.

According to some aspects, there is provided the subject matter of the independent claims. Some further aspects are defined in the dependent claims. The embodiments that do not fall under the scope of the claims are to be interpreted as examples useful for understanding the disclosure.

DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
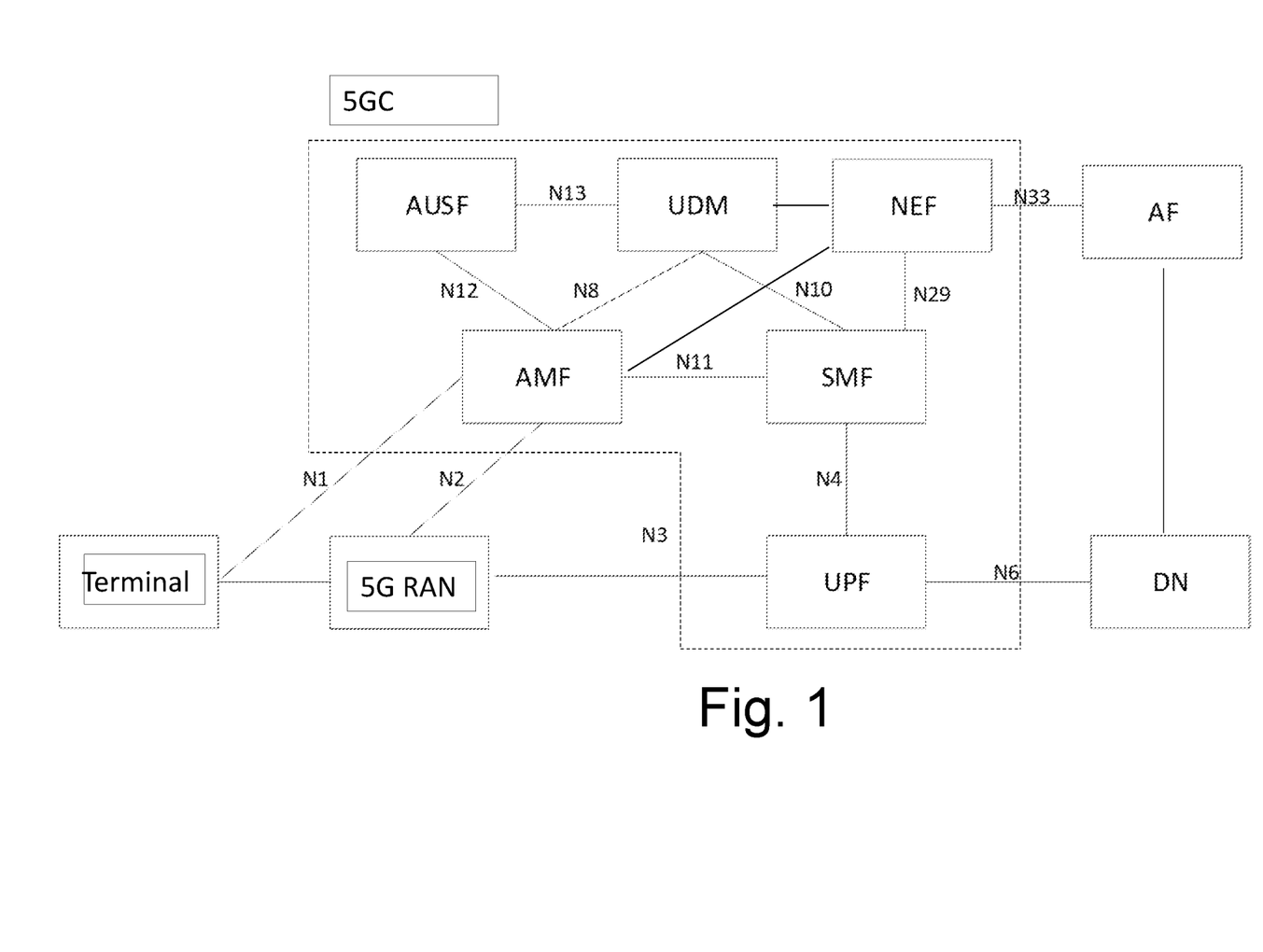
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF). FIG. 1 also shows the various interfaces (N1, N2 etc.) that may be implemented between the various elements of the system.

Figure 2:
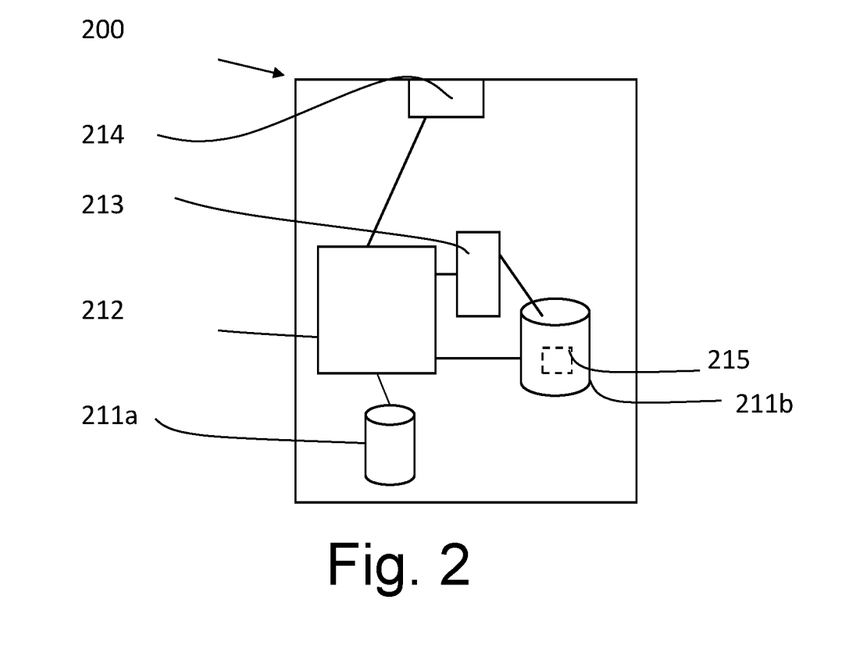
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
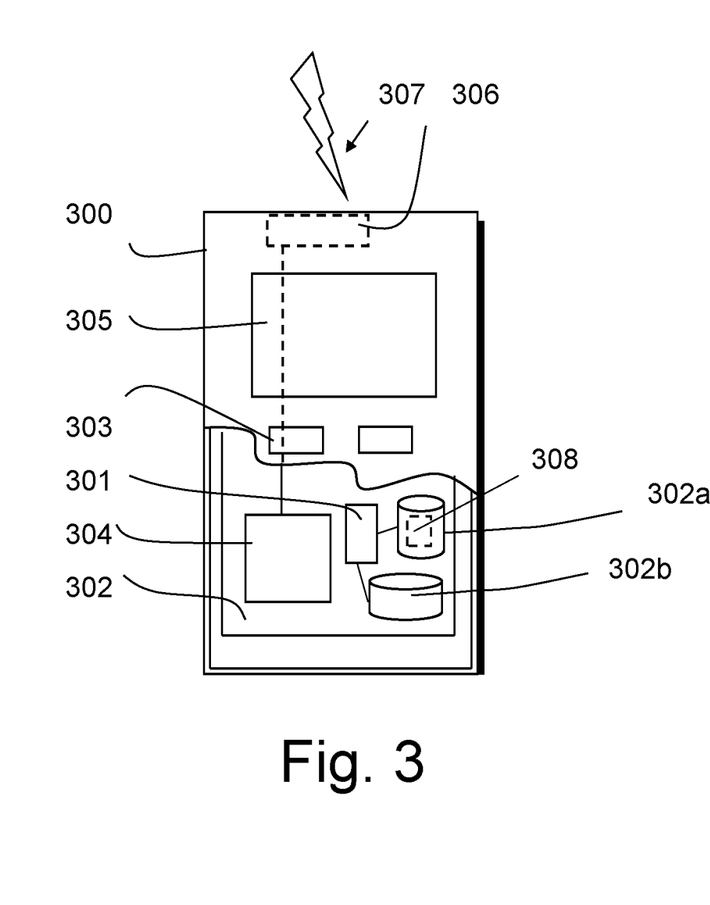
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IOT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

Some use cases may utilise quality of service (QOS) parameters to define a certain service level for the use case—for example, a certain latency or packet error rate for transmissions. A user quality of experience (QoE) may also be defined, which may be a "perceived quality" experienced by the user. While the QoS may relate to physically measurable quantities, and in some examples may be controlled, the QoE may or may not directly relate to the QoS, and may not be based on physically measurable quantities.

Some use cases may address both QoS and QoE holistically. Some use cases may implement dynamic QoE provisioning for certain applications. This may include accommodating dynamic changes in user policies and allocation of network resources, on-demand QoE provisioning based on application requirements, application service enablement on distributed cloud platforms, automated and accountable service management, user visibility of QoE, and consistent service across networks through seamless roaming and across tiered upgrades.

Some use cases may include immersive gaming and entertainment for the end-users. With improved reliability, latency, ubiquitous connectivity and superior bandwidth, some network implementations may help provide a desirable QoE. However, while the QoS (which may be related to the network or the media delivery) can be measured as well as controlled, the QoE (which may be related to the end-user) may be influenced primarily by the system, content and human factors, and may not be measured or controlled to the same extent.

System factors influencing the QoE may include network related factors (such as packet delay budget (PDB), latency, throughput, packet error rate (PER), packet loss ratio (PLR), average data rate (DR), bandwidth (BW), jitter), content related factors (such as temporal or spatial requirements, colour depth, texture, 2D/3D), media related factors (such as (de-)encoding quality, (re-)buffering time, resolution, sampling rate, frame rate, media synchronization) and device related factors (such as user interface capabilities, loudspeakers, headphones, computational power, memory, battery life).

The context factors may include external environment factors (such as lighting and sound, location and economic factors such as the price and budget).

The human/user factors may relate to factors such as the user's gender, age, education, senses, preference, emotions, personality traits and hobbies.

The system, context and human factors described above may also be referred to herein as influence factors.

In order to ensure a desirable QoE or employ corrective measures in order to improve or maintain an acceptable QoE, it may be useful to find means to measure or quantify the QoE and consider this information in the network, e.g., by adapting the QoS parameters of the user session.

Considering QoE measures may help the network to avoid over-provisioning, for example to upgrade or downgrade (if needed) the level of QoS that is needed to guarantee a certain QoE, but not provide more network resources than needed for that purpose. In some examples a feedback mechanism may be implemented where the QoS is adapted based on the calculated QoE which in turn may impact the QoE for the user.

Therefore it may be beneficial to estimate QoE in order to understand how well an experience has been perceived by the end-users such that appropriate measure can be taken to maintain or ensure an acceptable QoE and satisfaction for the end-users/customers.

Some examples may provide a method to estimate QoE, leverage QoE to influence QoS within the network (e.g. to adapt resource allocation, improve capacity utilization, improve end user experience), and/or report measured QoE towards the UE and the application.

Figure 4:
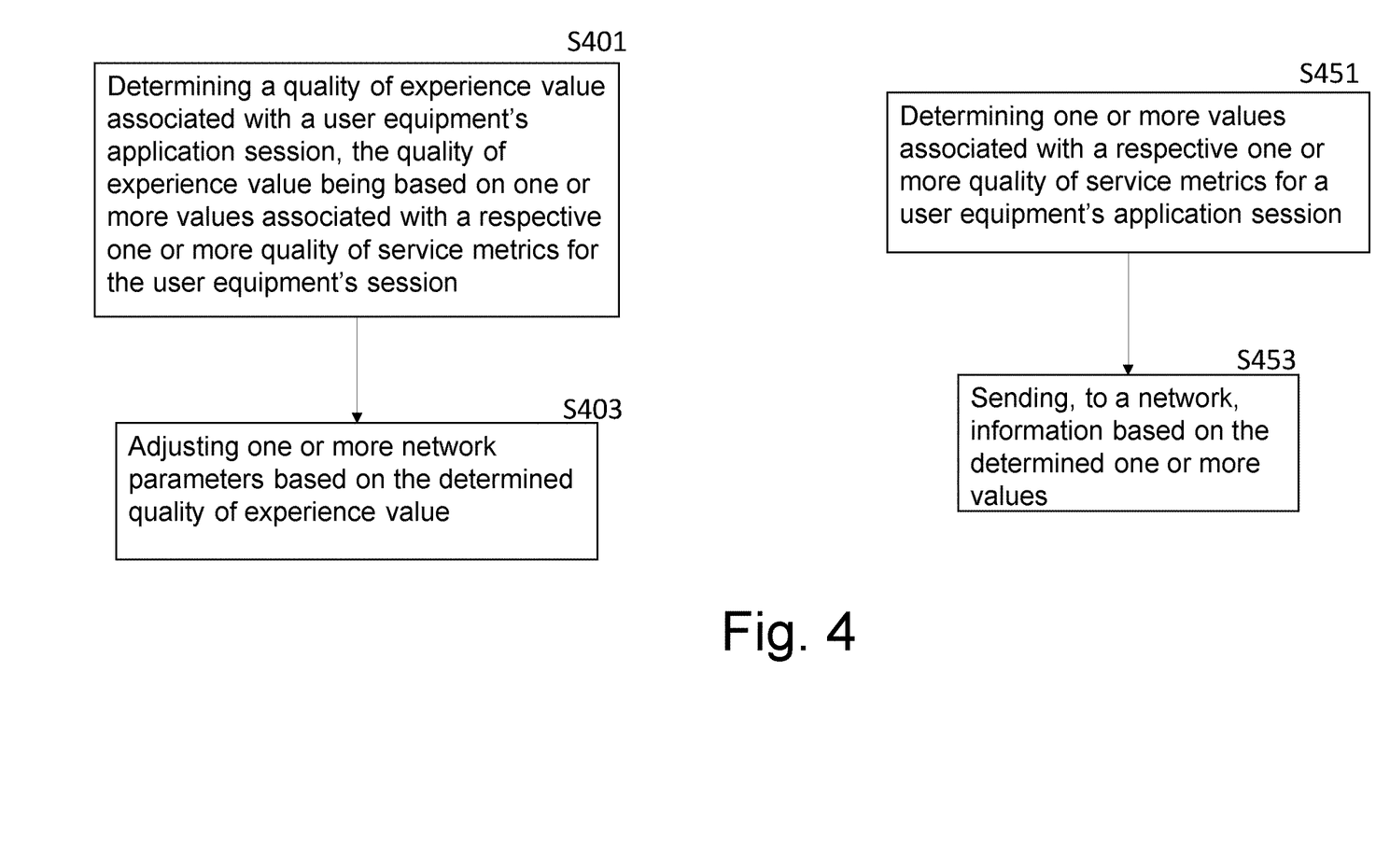
FIG. 4 shows methods according to some examples.

Reference is made to FIG. 4, which shows methods according to some examples.

Steps S401 and S403 are method steps that may be performed by a first apparatus. In some examples, one of: the first apparatus is comprised within a network function, the first apparatus is for the network function, and the first apparatus is the network function. For example, the network function may be a network data analytics function (NWDAF).

At S401, the method comprises: determining a quality of experience value associated with a user equipment's application session, the quality of experience value being based on one or more values associated with a respective one or more quality of service metrics for the user equipment's session.

At S403, the method comprises: adjusting one or more network parameters based on the determined quality of experience value.

Steps S451 and S453 are method steps that may be performed by a second apparatus. In some examples, one of: the second apparatus is comprised within a user equipment, the apparatus is for the user equipment, and the apparatus is the user equipment.

At S451, the method comprises: determining one or more values associated with a respective one or more quality of service metrics for a user equipment's application session.

At S453, the method comprises sending, to a network, information based on the determined one or more values.

Some examples may provide a QoE model that maps an application's QoS metrics (such as latency, Packet error rate (PER), Packet Loss Rate (PLR), jitter (delay variation), average Data Rate, etc) and network related system factors to an aggregate score (AS). In some examples, the model may be implemented in the network, for example by a Network Data Analytics Function (NWDAF). In other examples, the model may be implemented in a UE.

The AS may follow an Absolute Category Rating (ACR)—for example an ACR score (ACRS) of 5 may mean excellent quality, while an ACRS of 1 may mean bad quality. The ACR may be an indicator of the end-user satisfaction.

The AS may be calculated in the UE or network and provided to an application function, for example via exposure API and/or application layer signaling. If the AS is calculated in the UE, it may be provided to the network via control or user plane.

The AS may be leveraged by the network for dynamically adjusting QoS parameters or other network parameters in order to improve capacity utilization and user experience. Alternatively, or additionally, the adjusting may reduce resource utilization in the network. This way end user satisfaction may be maintained at a certain level, while improving overall network performance.

The following table depicts multiple QoE values influencing network related system factors that may be used to determine an AS for an immersive gaming and entertainment performance use case. It should be understood that this table is provided for illustrative purposes, and that in some examples some of the elements may be omitted, or a different use case, QoS metrics, metric values, and ACRS may be used.

| Use case | 6QI | Resource Type | Priority level | Metric | Metric weight w | Metric Class | Metric values V | Actual Metric value | Absolute Category Rating (ACR) Score (ACRS) |
|---|---|---|---|---|---|---|---|---|---|
| XRM for immersive gaming and entertainment | Numerical value (e.g. 1, 9 or 68) | GBR//Non-GBR/delay-critical | 1 | M1: Latency | w1 | 1 | 50 ms | 50 ms | 5 |
| | | | | | | 2 | 90 ms | | 4 |
| | | | | | | 3 | 120 ms | | 3 |
| | | | | | | 4 | 130 ms | | 2 |
| | | | | | | 5 | 150 ms | | 1 |
| | | | | M2: PER | w2 | 1 | 10e−7 | 10e−7 | 5 |
| | | | | | | 2 | 10e−5 | | 4 |
| | | | | | | 3 | 10e−4 | | 3 |
| | | | | | | 4 | 10e−3 | | 2 |
| | | | | | | 5 | 10e−2 | | 1 |
| | | | | M3: PLR | w3 | 1 | V1 | 1-2.5% of total packet stream | 5 |
| | | | | | | 2 | V2 | | 4 |
| | | | | | | 3 | V3 | | 3 |
| | | | | | | 4 | V4 | | 2 |
| | | | | | | 5 | V5 | | 1 |
| | | | | M4: Jitter | w4 | 1 | V1 | Some μs | 5 |
| | | | | | | 2 | V2 | | 4 |
| | | | | | | 3 | V3 | | 3 |
| | | | | | | 4 | V4 | | 2 |
| | | | | | | 5 | V5 | | 1 |
| | | | | M5: Avg Data Rate | w5 | 1 | V1 | UL-Very high Data Rate | 5 |
| | | | | | | 2 | V2 | | 4 |
| | | | | | | 3 | V3 | | 3 |
| | | | | | | 4 | V4 | DL-High Data Rate | 2 |
| | | | | | | 5 | V5 | | 1 |

An aggregate score (AS) may be calculated from the different Absolute Category Rating Score (ACRS) values associated with a metric and their relative weights. For example, in the table above, the QoE model considers latency, packet error rate (PER), Packet loss rate (PLR), Jitter (J) and average data rate as the QoS metrics for the given application and assigns weights (w) to each metric to indicate the importance and impact on the application.

The different attributes of the QoE model shown in the table may be defined as follows:

6QI: A numerical value that may be used in 6G as a reference to a specific QoS forwarding Behaviour. This is similar to the 5G QoS identifier (5Q1) defined in 5G.

Resource type: may be indicative of how dedicated network resources related to a QoS flow level are allocated (for example, a resource type could comprise of guaranteed bit rate (GBR), non-GBR, adaptive GBR).

Priority level (P): The priority level associated with QoS characteristics and may indicate the priority in scheduling resources among QoS flows.

Metric weight (w): The weight assigned to a metric, which may reflect the sensitivity of the application related to the corresponding metric.

Metric class (V): The metric class, which may map to the metric values/ranges. The selection of the class may affect the QoE.

Actual metric value: This refers to the QoS metric value.

ACRS: a value indicating how sensitive an application is regarding a certain metric value or metric value range. The ACRS may be defined based on the application or application type (for example, an Augmented Reality (AR) application type).

The actual metric value and metric class may be used to determine the ACRS for a particular instant. For example, when the actual metric value is above the maximum metric class value, the ACRS may be the maximum ACRS, which in the above example is 5. When the actual metric value is between one metric class value and another metric class value (i.e. when the actual metric value is within a certain range of values), the ACRS may be a different value. Taking the above table as an example, when the actual metric value for latency is 45 ms, the ACRS may be 5, and when the actual metric value for latency is 78 ms, the ACRS may be 4.

An example AS calculation is given below. It should be understood that, in other examples, different mechanisms for calculating the AS may be used.

In this example, the QoE model caters to a single application, and so the priority level is set to be 1. If the QoE model relates to more than one application, then the priority level associated with each application may be different, and the QoE model may reflect this by scaling the application(s) with a higher priority level to have a higher AS.

In this example the AS is mapped to the following QoS metrics: latency, packet error rate (PER), Packet loss rate (PLR), Jitter (J) and average data rate (DR). The AS may be determined based on a weighted sum of the ACRS for the different metrics.

Each QoS metric may be assigned a weight depending on the relative importance of the QoS metric for the given application. In this example, weights are assigned as w1=0.5, w2=0.1, w3=0.1, w4=0.1 and w5=0.2, indicative of the sensitivity of the application to latency and the average DR over PER, PLR and jitter.

If for instance, the XRM for immersive gaming and entertainment application corresponds to the best possible metric values (same as the actual value), then the ACRS will be 5 for each metric. The AS may be calculated by the following formula Aggregate Score =

$$\sum_{i=1}^{5} w_i \cdot ACRS = 0.5(5) + 0.1(5) + 0.1(5) + 0.1(5) + 0.2(5) = 5$$

where ACRS is 5-Excellent, 4-Good, 3-Fair, 2-Poor and 1-Bad.

The aggregate score (AS) may therefore be considered as a cumulative effect of each QoS metric on the total network performance. If any of the metric values degrade, then there may be a corresponding decreasing quality score.

For example, if the packet error rate were to change from 10e−6 to 10e−4, the ACRS would change from 5 to an ACRS of 3 for the PER. The AS would then become:

$$= 0.5(5) + 0.1(3) + 0.1(5) + 0.1(5) + 0.2(5) = 4.8$$

The relatively small change in QoE value may indicate that only a relatively small change in end user QoE is expected due to the change in packet error rate.

However, if the PER remained at 10e−6, but the latency changed from 50 ms to 150 ms, then the ACRS would change from 5 to 1, and the AS would become:

$$= 0.5(1) + 0.1(5) + 0.1(5) + 0.1(5) + 0.2(5) = 3$$

This would represent a more significant decrease in end user QoE.

In some examples, the network may determine a QoE value based on the AS. For example, the QoE value may be the AS value. However, in other examples, the QoE value may be determined based on a mapping function applied to at least the AS. Additionally, in some examples the QoE value may be determined based on not only the AS but also other parameters, such as the priority level and/or the metric class.

For example, a QoE value may be defined as follows:

$$QoE \text{ value} = f(AS, \text{priority level, metric class})$$

The mapping function may for example be chosen to be a non-linear exponential mapping function, as in some examples the performance of the metrics considered may not be scaled uniformly. With this example mapping function, when the QoE value is high, significant variation in the QoS metrics may drastically affect the QoE whereas if the QoE value is low, significant variations in the QoS metrics may have negligible effect on the QoE value.

It should be understood that, in other examples, a different mapping function other than the above example may be utilized. In some examples, different parameters other than the priority level and metric class may be used. In some examples, a scaling constant or other parameter may be included in the QoE value determination.

The QoS metrics may be used to evaluate the application performance. The AS may capture the effect of each of the QoS metrics on the overall performance. If any of the metrics is below the actual metric value, the AS may fluctuate, and consequently the QoE value may fluctuate.

The QoE value can be used by the network. For example, based on the QoE value, the network may determine how to adapt QoS parameters, or determine whether it should request application to adapt data rate (i.e. as an input factor to trigger L4S).

Furthermore, based on the QoE value, the network may determine that QoS metrics, such as the latency and reliability, should be improved (for example, a low QoE value may be a trigger for establishing dual sessions).

In some examples, the network may report the QoE value towards the AF for the AF to adapt one or more parameters (e.g. data rate, codec) associated with the session for the user. In some examples, the network may send information identifying the UE along with the QoE value. The AF may then adapt one or more parameters based on the reported value. For example, adapting the date rate or selecting a different codec. For example, the AF may request the network to change QoS parameters of the application session.

In some examples, if the determined QoE value is above a threshold value, the network may determine that sufficient resources are being allocated for the user. The network may determine to reallocate some resources for alternate uses or adjust certain QoS parameters while monitoring the QoE value, and if the QoE value drops below the threshold, then the network may divert some of the reallocated resources back to the user or revert some of the QoS parameter changes to ensure the QoE is maintained at or above the threshold.

However, if the QoE value is below the threshold, then the network may determine that insufficient resources are being allocated for the user or that some QoS parameters need adjusting. The network may determine to allocate additional resources or adjust QoS parameters to try and boost the QoE value.

For example, in the above example, if initially in a best case scenario where each ACRS is 5, then the AS (and therefore the QoE value) may be 5. However, when the latency degrades to the point where the ACRS becomes 1, then as shown above the AS/QoE value may degrade to 3.

Based on this, the network may take action to try and improve the user QoE as indicated by the QoE value. For example, the network may take steps to improve the latency.

While the network may not necessarily know which QoS parameter to target to try and improve the QoE value based on the QoE value alone, the network may continuously or iteratively determine the QoE value and take steps to adapt QoS parameters until the desired improvement is achieved.

For example, the network may initially take steps to improve the PER and jitter but see no improvement in the QoE value. However, when the network takes steps to improve the latency, a corresponding improvement in QoE value may be achieved.

In some examples, the network may take a different action to try to improve the user QoE. For example, the network may reserve more bandwidth or network resources for the application.

Thus, in some examples, the network may continuously or periodically determine the QoE value, take steps to adjust QoS parameters based on the determined value, then determine a subsequent QoE value and take further steps to further adjust the QoS parameters based on the subsequent QoE value.

In some examples, the determination of the average score and the QoE value may be performed by the network, for example a network function such as a network data analytics function (NWDAF).

In other examples, the UE may determine at least a part of the data necessary for determining the average score and/or QoE value and forward that data to the network. In some examples the UE may determine one or more of the values used to calculate the average score, the average score and/or the QoE value, and send the determined value(s)/score/QoE value to the network for the network to use. The UE may also send, to the network, information indicating the application being used by the UE.

Figure 5:
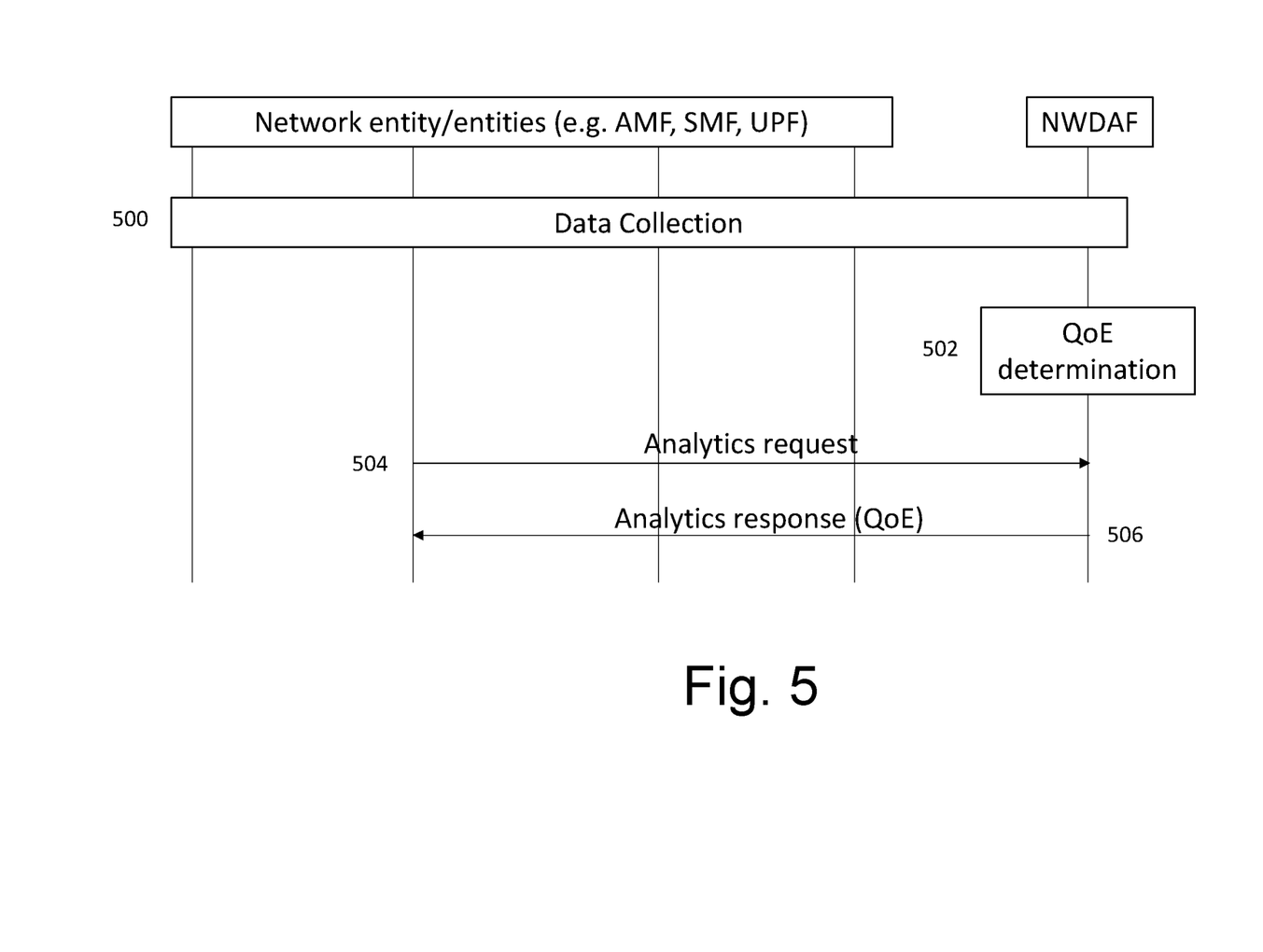
FIG. 5 shows a signalling diagram according to some examples.

Reference is made to FIG. 5, which shows a signalling diagram according to some examples.

At 500, a network function, such as the network data application function (NWDAF), collects data from one or more network entities. The one or more network entities may for example comprise an AMF, SMF, UPF, and/or UDM/UDR.

At 502, the network function, based on the collected data, determines a QoE value, for example based on the methods described previously.

At 504, a network entity, for example a network function such as but not limited to the AMF, SMF, or PCF, may send, to the network function (e.g. NWDAF), a request for data analytics including the QoE value. In some examples, the request may comprise a request for the QoE value stored in subscription data.

At 506, in response to the request, the network function (e.g. NWDAF) provides the requested analytics including the QoE value to the requesting network entity (e.g. AMF). Where the request comprises a request for subscription data. The network function may provide the QoE value based on the subscription data. For example, periodically, or when the QoE value changes in the subscription data.

Some examples may provide a method for estimating QoE based on parameters and criteria available within the UE and network without having to rely on parameters that are subjective and/or criteria that is dependent on human/end user perception. Absolute category ratings can be determined based on the actually incurred data (e.g., actually incurred delay for a given packet) for key QoS parameters.

Furthermore, some examples may provide a method to leverage estimated QoE for adapting QoS in the network. Dynamic QoE provisioning may be employed to enable the network to adapt in order to provide better user experience at the same time also efficiently leverage available and limited capacity in the network for more sessions/users.

In some examples, there is provided an apparatus comprising means for performing any of the aforementioned method steps.

For example, a first apparatus may comprise means for: determining a quality of experience value associated with a user equipment's application session, the quality of experience value being based on one or more values associated with a respective one or more quality of service metrics for the user equipment's session; and adjusting one or more network parameters based on the determined quality of experience value.

In some examples, the first apparatus may comprise at least one processor, and at least one memory storing instructions that, when executed by the one or more processors, cause the apparatus to perform: determining a quality of experience value associated with a user equipment's application session, the quality of experience value being based on one or more values associated with a respective one or more quality of service metrics for the user equipment's session; and adjusting one or more network parameters based on the determined quality of experience value.

For example, a second apparatus may comprise means for: determining one or more values associated with a respective one or more quality of service metrics for a user equipment's application session; and sending, to a network, information based on the determined one or more values In some examples, the second apparatus may comprise at least one processor, and at least one memory storing instructions that, when executed by the one or more processors, cause the apparatus to perform: determining one or more values associated with a respective one or more quality of service metrics for a user equipment's application session; and sending, to a network, information based on the determined one or more values.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable): a combination of analog and/or digital hardware circuit(s) with software/firmware and any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. A core network comprising:
   a first apparatus comprising: at least one processor; and at least one memory storing instructions of a network analytics and data function (NWADF) that, when executed by the at least one processor, cause the first apparatus at least to perform:
      collecting, from a first one or more network functions (NFs), one or more actual metric values for one or more quality of service metrics associated with an application session of a user equipment, wherein a respective actual metric value of the one or more actual metric values for a respective quality of service metric of the one or more quality of service metrics comprises a value of the respective quality of service metric;
      determining a quality of experience value associated with the application session of the user equipment based on the one or more actual metric values for the one or more quality of service metrics associated with the application session of the user equipment, wherein the quality of experience value is based on an aggregate score comprising a sum of respective values corresponding to the one or more values associated with the one or more quality of service metrics for the application session of the user equipment; and
      sending the quality of experience value to a second network function (NF); and
   a second apparatus comprising: at least one processor; and at least one memory storing instructions of the network function that, when executed by the at least one processor of the second apparatus, cause the second apparatus at least to perform:
      receiving the quality of experience value; and
      adjusting one or more network parameters based on the quality of experience value.

2. The core network of claim 1, wherein a respective quality of service metric of the one or more quality of service metrics has a respective weighting value, and wherein the respective values corresponding to the one or more values associated with the one or more quality of service metrics comprise respective values that are weighted according to the respective weighting value of the one or more quality of service metrics.

3. The core network of claim 1, wherein the quality of experience value is one of the following:
   the aggregate score; or
   based on applying a mapping function to the aggregate score.

4. The core network of claim 1, wherein the respective values of the one or more values associated with the respective one or more quality of service metrics is further based on: the actual metric value for the respective quality of service metric and a corresponding absolute category rating score of a plurality of absolute category rating scores for the respective quality of service metric, wherein each absolute category rating score of the plurality of absolute category rating scores for the respective quality of service metric is associated with a respective range of values for the respective quality of service metric.

5. The core network of claim 4, wherein the respective values of the one or more values associated with the respective one or more quality of service metrics corresponds to an absolute category rating score of the plurality of absolute category rating scores that are associated with the respective range of values that comprises the respective actual metric value.

6. The core network of claim 1, wherein the instructions of the second apparatus, when executed by the at least one processor of the second apparatus, further cause the second apparatus at least to perform:
comparing the quality of experience value to a threshold value, and wherein the adjusting is performed based on the comparing.

7. The core network of claim 1, wherein the instructions of the first apparatus, when executed by the at least one processor of the first apparatus, further cause the first apparatus at least to perform:
receiving, from the user equipment,
at least one additional metric value for one or more additional quality of service metrics associated with the application session of the user equipment.

8. The core network of claim 1, wherein the adjusting comprises:
comparing the quality of experience value to a threshold value; and
adjusting the one or more network quality of service parameters based on the comparing.

9. The core network of claim 1, wherein the adjusting comprises:
sending, to the application associated with the application session, a request to adapt one or more quality of service parameters associated with the application session of the user equipment.

10. The core network of claim 1, wherein the adjusting comprises:
sending, to an application function providing the application session of the user equipment, at least one of the following: information identifying the user equipment, the quality of experience value, the one or more quality of service metrics, or other related data.

11. The core network of claim 1, wherein first one or more network functions (NFs) comprises at least one of an access management function (AMF), a user plane function (UPF), a user data management function (UDM) or a user data repository function (UDSR).

12. The core network of claim 1, wherein the one or more network parameters comprise at least one of the following: a data rate, or a codec.

13. The core network of claim 1, wherein the adjusting further comprises:
establishing dual sessions for the user equipment.

14. The core network of claim 1, wherein the adjusting further comprises:
reallocating resources of the core network that are serving the user equipment, or
allocating additional resources of the core network to the user equipment.

15. The core network of claim 7, wherein the quality of experience value is further based on the at least one additional metric value for one or more additional quality of service metrics associated with the application session of the user equipment.

16. A method of a core network, the method comprising:
collecting, by a network data analytics function (NWDAF), from a first one or more network functions (NFs), one or more actual metric values for one or more quality of service metrics associated with an application session of a user equipment, wherein a respective actual metric value of the one or more actual metric values for a respective quality of service metric of the one or more quality of service metrics comprises a value of the respective quality of service metric;
determining, by the NWDAF, a quality of experience value associated with the application session of the user equipment based on the one or more actual metric values for the one or more quality of service metrics associated with the application session of the user equipment, wherein the quality of experience value is based on an aggregate score comprising a sum of respective values corresponding to the one or more values associated with the one or more quality of service metrics for the application session of the user equipment;
receiving, by a network function, the quality of experience value; and
adjusting one or more network parameters based on the quality of experience value.

17. The method of claim 16, wherein the quality of experience value is one of the following: the aggregate score; or based on applying a mapping function to the aggregate score.

18. The method of claim 16, wherein the respective values of the one or more values associated with the respective one or more quality of service metrics is further based on: the actual metric value for the respective quality of service metric and a corresponding absolute category rating score of a plurality of absolute category rating scores for the respective quality of service metric, wherein each absolute category rating score of the plurality of absolute category rating scores for the respective quality of service metric is associated with a respective range of values for the respective quality of service metric.

19. The method of claim 18, wherein the respective values of the one or more values associated with the respective one or more quality of service metrics corresponds to an absolute category rating score of the plurality of absolute category rating scores that are associated with the respective range of values that comprises the respective actual metric value.

20. The method of claim 16, further comprising: comparing, by the network function, the quality of experience value to a threshold value, and wherein the adjusting is performed based on the comparing.

21. The method of claim 16, further comprising: receiving, by the NWDAF, from the user equipment, at least one additional metric value for one or more additional quality of service metrics associated with the application session of the user equipment.

22. The method of claim 16, wherein the adjusting further comprises: establishing dual sessions for the user equipment, reallocating resources of the core network that are serving the user equipment, or allocating additional resources of the core network to the user equipment.

23. A non-transitory computer-readable medium storing instructions, which when executed by an apparatus, cause the apparatus to perform at least the following:
collecting, by a network data analytics function (NWDAF), from a first one or more network functions (NFs), one or more actual metric values for one or more quality of service metrics associated with an application session of a user equipment, wherein a respective actual metric value of the one or more actual metric values for a respective quality of service metric of the one or more quality of service metrics comprises a value of the respective quality of service metric;
determining a quality of experience value associated with the application session of the user equipment based on the one or more actual metric values for the one or more quality of service metrics associated with the application session of the user equipment, wherein the quality of experience value is based on an aggregate score comprising a sum of respective values corresponding to the one or more values associated with the one or more quality of service metrics for the application session of the user equipment; and receiving, by a network function, the quality of experience value; and adjusting one or more network parameters based on the quality of experience value.

* * * * *